(12) United States Patent
Kim et al.

(10) Patent No.: US 7,502,558 B2
(45) Date of Patent: Mar. 10, 2009

(54) ILLUMINATING SYSTEM FOR CAMERA

(75) Inventors: Jae-bum Kim, Gwangju Metropolitan (KR); Jung-pa Seo, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 498 days.

(21) Appl. No.: 11/170,543

(22) Filed: Jun. 29, 2005

(65) Prior Publication Data

US 2006/0188244 A1  Aug. 24, 2006

(30) Foreign Application Priority Data

Feb. 21, 2005  (KR) ...................... 10-2005-0014092

(51) Int. Cl.
*G03B 15/03* (2006.01)

(52) U.S. Cl. ...................... 396/155; 396/176; 359/639; 362/16; 362/268

(58) Field of Classification Search ................ 396/155, 396/176, 200; 359/362, 385, 615, 616, 618, 359/639, 640, 662, 741; 362/169, 215, 268, 362/16

See application file for complete search history.

(56) References Cited

U.S. PATENT DOCUMENTS

| | | | | | |
|---|---|---|---|---|---|
| 4,619,508 | A | * | 10/1986 | Shibuya et al. | 353/122 |
| 4,682,885 | A | * | 7/1987 | Torigoe | 355/67 |
| 4,884,869 | A | * | 12/1989 | Uemura | 359/641 |
| 5,253,110 | A | * | 10/1993 | Ichihara et al. | 359/619 |
| 5,347,433 | A | * | 9/1994 | Sedlmayr | 362/554 |
| 6,179,447 | B1 | | 1/2001 | Ishikawa et al. | |
| 6,246,526 | B1 | * | 6/2001 | Okuyama | 359/621 |
| 6,285,440 | B1 | * | 9/2001 | Takahashi | 355/67 |
| 6,639,652 | B1 | * | 10/2003 | Mori et al. | 355/67 |
| 2001/0048560 | A1 | * | 12/2001 | Sugano | 359/618 |
| 2002/0033933 | A1 | * | 3/2002 | Yamamoto | 353/94 |

FOREIGN PATENT DOCUMENTS

| | | |
|---|---|---|
| EP | 0 840 525 A1 | 5/1998 |
| EP | 0 849 619 A1 | 6/1998 |
| JP | 2001-100282 A | 4/2001 |
| JP | 2001-337204 A | 12/2001 |
| JP | 2004-022015 A | 1/2004 |
| JP | 2004-220015 A | 8/2004 |
| JP | 2004-220016 A | 8/2004 |
| JP | 2004-252469 A | 9/2004 |
| JP | 2004-287357 A | 10/2004 |
| KR | 2004-0107690 A | 12/2004 |

OTHER PUBLICATIONS

Examination Report established for GB0515566.8 (Jun. 1, 2007).

* cited by examiner

*Primary Examiner*—Christopher E Mahoney
*Assistant Examiner*—Michael A Strieb
(74) *Attorney, Agent, or Firm*—Drinker Biddle & Reath LLP

(57) ABSTRACT

An illuminating system for a camera that can illuminate an area according to an angle of view of the camera for stroboscopy is provided. The illuminating system includes: a light source emitting light; and an illuminating lens arranged in an optical path of the light emitted from the light source and having a fly-eye lens surface with a plurality of lens cells thereon and an aspherical or spherical lens surface opposite to the fly-eye lens surface.

16 Claims, 3 Drawing Sheets

ILLUMINATING SYSTEM FOR CAMERA

CROSS-REFERENCE TO RELATED PATENT APPLICATIONS

This application claims the benefit of Korean Patent Application No. 10-2005-0014092, filed on Feb. 21, 2005, in the Korean Intellectual Property Office, the disclosure of which is incorporated herein in its entirety by reference.

BACKGROUND OF THE INVENTION

1. Field of the Invention

The present invention relates to an illuminating system for a camera using a light emitting diode (LED), and more particularly, to an illuminating system for a camera in which a LED is used as a light source illuminating an area according to an angle of view of the camera for stroboscopy.

2. Description of the Related Art

In general, with the development of small digital cameras, portable electronic devices integrated with small digital cameras, such as mobile phones, MP3 players, portable digital assistants (PDAs), etc., have become commercially available.

Conventional digital cameras with 300,000 pixels to millions of pixels are under development to satisfy a customer's desire for high performance digital cameras with more pixels. In addition, there is a need to develop an illuminating system including a LED light source for stroboscopic photography.

An illuminating system for a camera developed to comply with such a requirement is disclosed in the Japanese Laid-open Patent Publication No. 2004-252469 (entitled "Camera-integrated Mobile Phone", published Sep. 9, 2004). In the illuminating apparatus, light emitted from an LED is illuminated using a spherical lens, an aspherical lens, or a Fresnel lens over an area separated by a predetermined distance according to an angle of view of the camera. However, due to a structural limitation of the lens used in the illuminating system, it is difficult to illuminate the entire area with a uniform brightness.

Japanese Laid-open Patent Publication No. 2004-287357 (entitled "Fly-eye lens for camera strobo built in mobile phone", published Oct. 14, 2004) discloses an illuminating system. The illuminating system includes a fly-eye lens in front of an LED. However, due to low light condensing efficiency, it is difficult to obtain a desired brightness.

SUMMARY OF THE INVENTION

The present invention, which has been developed in consideration of the above-described limitations, provides an illuminating system for a camera that can improve the brightness of light emitted from a light source and illuminate uniformly.

According to an aspect of the present invention, there is provided an illuminating system for a camera, comprising: a light source emitting light; and an illuminating lens arranged in an optical path of the light emitted from the light source and having a fly-eye lens surface with a plurality of lens cells thereon and an aspherical or spherical lens surface opposite to the fly-eye lens surface.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
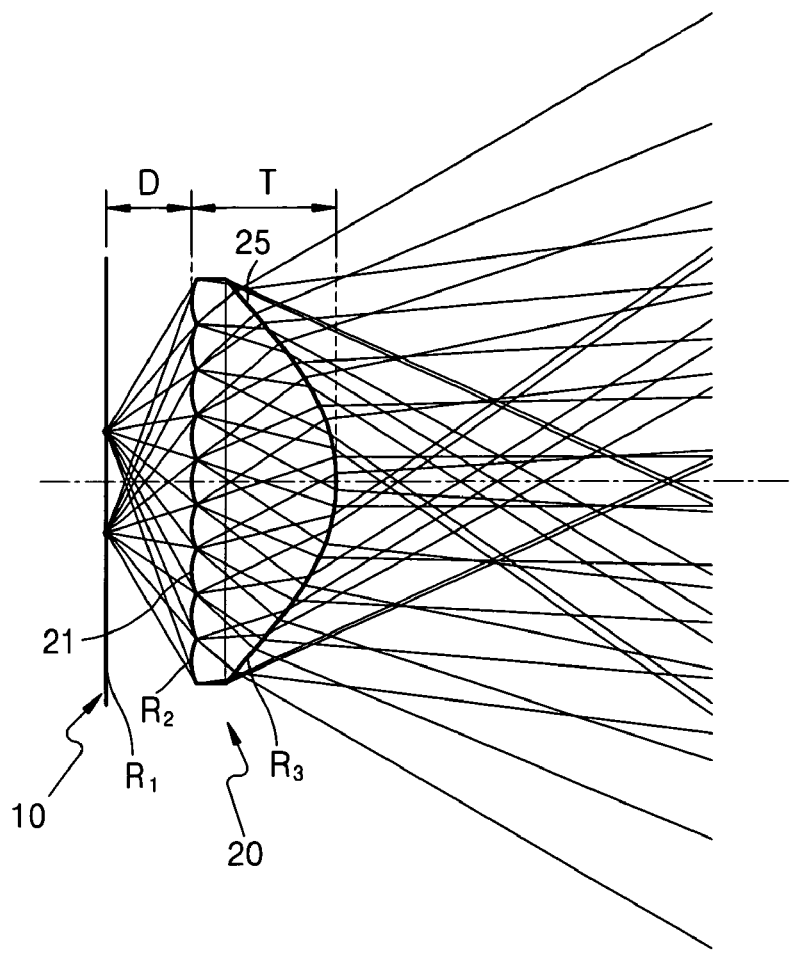
FIG. 1 illustrates an optical arrangement of an illuminating system for a camera according to a first embodiment of the present invention.
Figure 2:
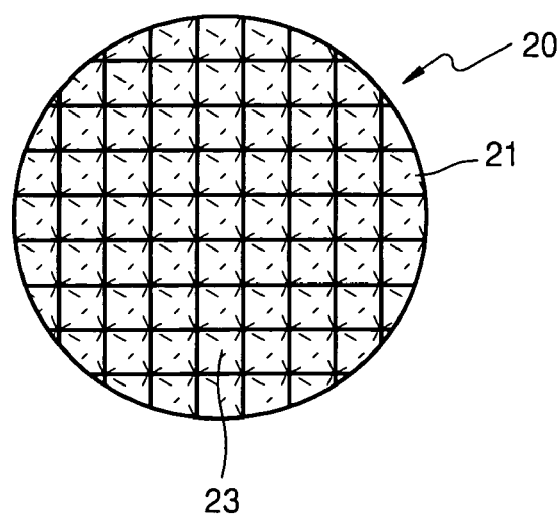
FIG. 2 is a top view of a fly-eye lens surface of an illuminating lens in FIG. 1.

FIG. 1 illustrates an optical arrangement of an illuminating system for a camera according to a first embodiment of the present invention, and FIG. 2 is a top view of a fly-eye lens surface of an illuminating lens in FIG. 1.

Referring to FIG. 1, an illuminating system for a camera according to a first embodiment of the present invention includes a light source 10 and an illuminating lens 20 converging the light emitted from the light source 10 into uniform converging light. The light source 10 may include at least one of small light sources, such as light emitting diodes (LEDs). The light source 10 emits diverging light toward the illuminating lens 20. The illuminating lens 20 is arranged a predetermined distance D away from the light source 10 in an optical path of the light emitted from the light source and has a positive refracting power. The illuminating lens 20 has a fly-eye lens surface 21, which makes uniform the intensity of the light emitted from the light source 10, and a lens surface 25 opposite to the fly-eye lens surface 21. The lens surface 25 is an aspherical or spherical plane that converges incident light. The illuminating lens 20 may be arranged such that its fly-eye lens surface 21 faces the light source 10.

As illustrated in FIG. 2, the fly-eye lens surface 21 may be constructed as a combination of a plurality of lens cells 23 separately converging incident light. The plurality of lens cells 23, each of which has a convex shape, are arranged in 2 dimensions. The light emitted from the light source 10 is uniformly converged in the lens cell units 23 while being transmitted through the fly-eye lens surface 21.

The lens surface 25 converges the uniform light passed through the fly-eye plane 21 such that the light can be illuminated according to an angle of view of the camera. As a result, the brightness of the illuminating light can be improved. To this end, the lens surface 25 is formed as an aspherical or spherical plane.

To uniformly illuminate an area separated a desired distance from the light source 10 with enhanced brightness, the light source 10 and the illuminating lens 20 may be designed to comply with the conditions defined in formulas (1) and (2) below.

$$15° \leq \tan^{-1}\frac{d}{D} \leq 31° \qquad (1)$$

where d is a height of each of the lens cells 23, and D is a distance between the light source 10 and the fly-eye lens surface 21.

Formula (1) above defines the range of incidence for angles of light entering each of the lens cells 23. When d and D satisfy formula (1), uniform intensity illuminating light can be obtained as is apparent from the intensity distributions of light illuminated by illuminating systems according to first through fourth embodiments of the present invention described below.

If the incidence angle of the light is greater than the upper limit in formula (1), the illuminated area separated by a predetermined distance from the light source 10 has a non-uniform intensity distribution. If the incidence angle of the light is smaller than the lower limit in formula (1), it is difficult to manufacture an illuminating lens satisfying the condition defined in formula (1), and a center region of the illuminated area has a high light intensity distribution, thereby lowering illumination uniformity.

Formula (2) defines the relation between the curvatures of the lens cells 23 on the fly-eye lens surface 21 and the thickness of the illuminating lens 20.

$$\frac{T}{R} \leq 1.5 \quad (2)$$

where T is a thickness of the illuminating lens 20, and R is a radius of curvature of each of the lens cells 23.

When the relationship defined in formula (2) is satisfied, illuminating light of uniform intensity can be obtained. However, if the relationship defined in formula (2) is not satisfied, it is difficult to ensure uniform illumination distribution due to a difference in brightness between center and peripheral regions.

Each of the lens cells 23 may have a rectangular shape, for example, a square shape, when viewed from the light source 10. When each of the lens cells 23 has a square shape, processibility and productivity are improved because it is easy to implement their horizontally symmetrical radius of curvature.

Embodiments of the illuminating system for a camera according to the present invention will be described below.

An illuminating system for a camera according to a first embodiment of the present invention has an optical arrangement illustrated in FIG. 1. The illuminating system has lens data in Table 1.

TABLE 1

| | Radius of curvature | Distance or thickness | Refractive index | Deviation | Remark |
|---|---|---|---|---|---|
| Light source | $R_1 = \infty$ | D = 1 mm | — | — | — |
| Illuminating lens | $R_2 = 3$ mm | T = 1.8 mm | 1.49175 | 57.8 | 0.6 × 0.6 mm² (size of each lens cell) |
| | $R_3 = -1.8$ mm | — | | Aspherical surface (k = −0.9, A = 0.01) | |

Referring to Table 1, the lens cells on the fly-eye lens surface are arranged as illustrated in FIG. 2. Each of the lens cells has a 0.6×0.6-mm square shape. The lens surface has an aspherical surface having a conic constant k of −0.9 and an aspheric coefficient A of 0.01. The aspheric surface equation of the lens surface is represented by formula (3) below.

$$x = \frac{c' y^2}{1 + \sqrt{1 - (k+1)c'^2 y^2}} + Ay^4 + By^6 + Cy^8 + Dy^{10} \quad (3)$$

where x is a distance from the apex of the lens surface to an optical axis, y is a distance in a direction perpendicular to the optical axis, c' is the reciprocal of a radius of curvature on the apex of the lens surface, k is a conic constant, and A, B, C, and D are aspheric coefficients. In the present embodiment, B, C, and D are zero.

Figure 3:
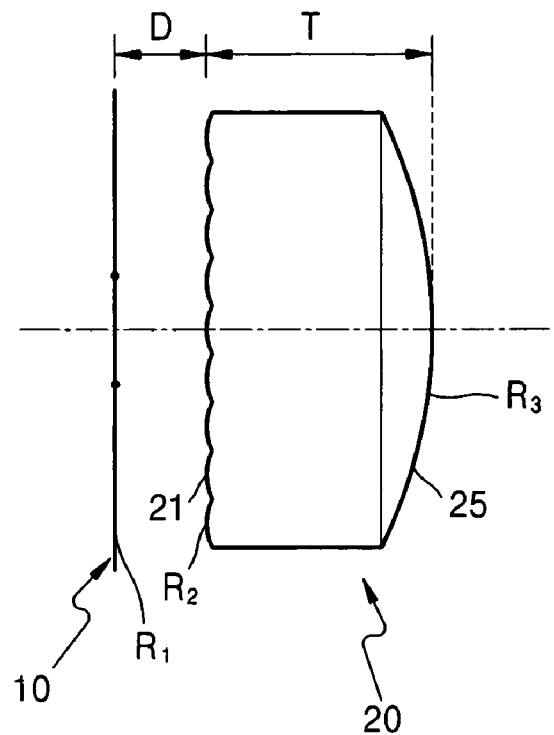
FIG. 3 illustrates an optical arrangement of an illuminating system for a camera according to a second embodiment of the present invention.

An illuminating system for a camera according to a second embodiment of the present invention has an optical arrangement illustrated in FIG. 3. The illuminating system has lens data in Table 2.

TABLE 2

| | Radius of curvature | Distance or thickness | Refractive index | Deviation | Remark |
|---|---|---|---|---|---|
| Light source | $R_1 = \infty$ | D = 1 mm | — | — | — |
| Illuminating lens | $R_2 = 2.26$ mm | T = 2.5 mm | 1.49175 | 57.8 | 0.6 × 0.6 mm² (size of each lens cell) |
| | $R_3 = -5.5$ mm | — | | Spherical surface (k = 0, A = 0) | |

Referring to Table 2, lens cells on a fly-eye lens surface of an illuminating lens in the illuminating system according to the second embodiment of the present invention are arranged as illustrated in FIG. 2. A lens surface of the illuminating lens is spherical.

Figure 4:
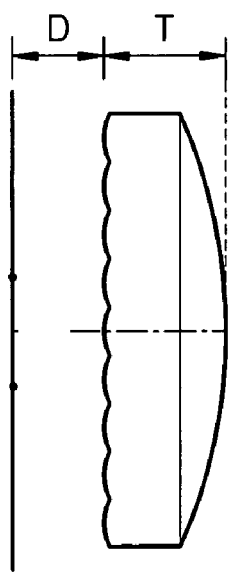
FIG. 4 illustrates an optical arrangement of an illuminating system for a camera according to a third embodiment of the present invention.

An illuminating system for a camera according to a third embodiment of the present invention has an optical arrangement illustrated in FIG. 4. The illuminating system has lens data in Table 3.

TABLE 3

|  | Radius of curvature | Distance or thickness | Refractive index | Deviation | Remark |
| --- | --- | --- | --- | --- | --- |
| Light source | $R_1 = \infty$ | D = 1 mm | — | — | — |
| Illuminating lens | $R_2 = 4$ mm | T = 1.5 mm | 1.49175 | 57.8 | $0.6 \times 0.6$ mm² (size of each lens cell) |
|  | $R_3 = -5.5$ mm | — | Aspherical surface (k = 0, A = 0.001) | | |

Referring to Table 3, lens cells on a fly-eye lens surface of an illuminating lens in the illuminating system according to the third embodiment of the present invention are arranged as illustrated in FIG. 2. Each of the lens cells has a 0.6×0.6-mm square shape. A lens surface of the illuminating lens is an aspherical surface satisfying formula 3 where a conic constant k is 0 and an aspheric coefficient A is 0.001.

Figure 5:
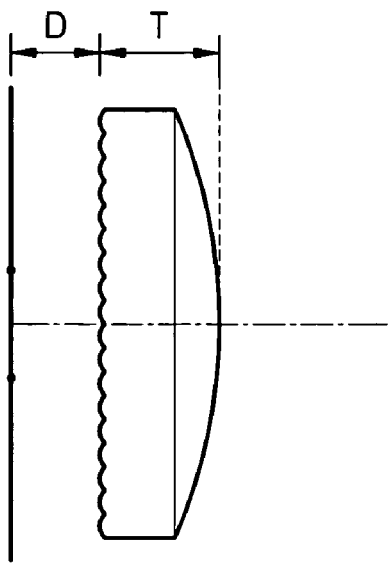
FIG. 5 illustrates an optical arrangement of an illuminating system for a camera according to a fourth embodiment of the present invention.

An illuminating system for a camera according to a fourth embodiment of the present invention has an optical arrangement illustrated in FIG. 5. The illuminating system has lens data in Table 4.

TABLE 4

|  | Radius of curvature | Distance or thickness | Refractive index | Deviation | Remark |
| --- | --- | --- | --- | --- | --- |
| Light source | $R_1 = \infty$ | D = 1 mm | — | — | — |
| Illuminating lens | $R_2 = 4$ mm | T = 1.5 mm | 1.49175 | 57.8 | $0.3 \times 0.3$ mm² (size of each lens cell) |
|  | $R_3 = -5.5$ mm | — | Aspherical surface (k = 0, A = 0.001) | | |

Figure 6:
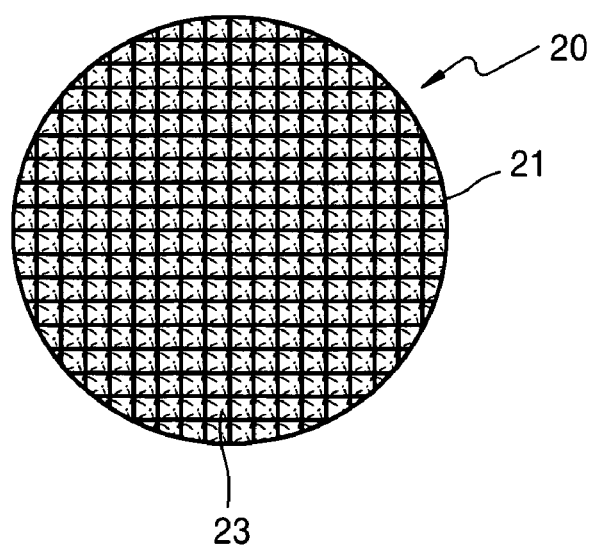
FIG. 6 is a top view of a fly-eye lens surface of an illuminating lens in FIG. 5.

Referring to Table 4, a lens surface of an illuminating lens in the illuminating system according to the fourth embodiment of the present invention has substantially the same optical arrangement and lens data as in FIG. 4 and Table 3. Each of a plurality of lens cells on a fly-eye lens surface of the illuminating lens has a 0.3×0.3-mm square shape illustrated in FIG. 6.

Each of the illuminating systems, according to the first through fourth embodiments of the present invention, satisfies the conditions in formulas (1) and (2). The results are shown in Table 5. Therefore, all of the illuminating systems according to the present invention illustrated in FIGS. 1, 3, 4, and 5 can produce converging light of uniform intensity.

TABLE 5

|  | Embodiment 1 | Embodiment 2 | Embodiment 3 | Embodiment 4 |
| --- | --- | --- | --- | --- |
| Formula (1) | 30.96° | 30.96° | 30.96° | 16.70° |
| Formula (2) | 0.60 | 1.11 | 0.38 | 0.38 |

As described above, an illuminating system for a camera according to the present invention includes an illuminating lens having a fly-eye lens surface with a plurality of lens cells thereon and a spherical or aspherical lens surface opposite to the fly-eye lens surface. The fly-eye lens surface makes uniform the intensity of incident light emitted from a light source, and the spherical or aspherical lens surface converges incident light to enhance the brightness of an area illuminated by the light. The processibility and productivity of the illuminating lens can be improved by forming the lens cells in the shape of squares.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illuminating system for a camera, comprising:
 a light source disposed immediately preceding a monolithic illuminating lens, the light source emitting light; and
 the monolithic illuminating lens arranged in an optical path of the light emitted from the light source and having a fly-eye lens surface with a plurality of lens cells thereon immediately preceding one of an aspherical and spherical lens surface opposite to the fly-eye lens surface, wherein the emitted light is substantially received directly by the fly-eye lens surface from the light source, wherein the illuminating system satisfies the condition:

$$15° \leq \tan^{-1}\frac{d}{D} \leq 31°$$

where d is a height of each of the lens cells, and D is a distance between the light source and the fly-eye lens surface.

2. The illuminating system of claim 1, wherein the monolithic illuminating lens is comprised of a plurality of lenses.

3. The illuminating system of claim 1, wherein the monolithic illuminating lens is arranged such that the fly-eye lens surface faces the light source.

4. The illuminating system of claim 1 satisfying the condition:

$$\frac{T}{R} \leq 1.5$$

where T is a thickness of the monolithic illuminating lens, and R is a radius of curvature of each of the lens cells.

5. The illuminating system of claim 4, wherein each of the lens cells has a square shape when viewed from the light source.

6. The illuminating system of claim 4 wherein the light source is at least one light emitting diode (LED).

7. The illuminating system of claim 1 wherein each of the lens cells has a square shape when viewed from the light source.

8. The illuminating system of claim 1 satisfying the condition:

$$\frac{T}{R} \leq 1.5$$

where T is a thickness of the monolithic illuminating lens, and R is a radius of curvature of each of the lens cells.

9. The illuminating system of claim 8, wherein each of the lens cells has a square shape when viewed from the light source.

10. An illuminating apparatus for an image processing device, the apparatus comprising:
   a light source disposed immediately preceding a monolithic illuminating lens, the light source emitting light; and
   the monolithic illuminating lens arranged in an optical path of the light emitted from the light source, the monolithic illuminating lens having a fly-eye lens surface with a plurality of lens cells thereon that separately converge incident light and one of an aspherical and spherical lens surface immediately following and opposite to the fly-eye lens surface, wherein emitted light is substantially received directly by the fly-eye lens surface from the light source, and wherein the plurality of lens cells are substantially convex and rectangular shaped, and the illuminating apparatus satisfies the condition:

$$15° \leq \tan^{-1}\frac{d}{D} \leq 31°$$

where d is a height of each of the lens cells, and D is a distance between the light source and the fly-eye lens surface.

11. An illumination method for improving the brightness and uniformity of light incident upon an image processing apparatus, the method comprising:
   receiving light from a light source;
   providing a monolithic illuminating lens disposed immediately following the light source such that the monolithic illuminating lens receives the light directly from the light source, the monolithic illuminating lens having a fly-eye lens surface having a plurality of adjacent lens cells thereon each of which is substantially convex in shape and each of which separately converges incident light, and immediately following the fly-eye lens surface one of a substantially aspherical and substantially spherical surface that converges incident light; and
   arranging the monolithic illuminating lens in an optical path of the light emitted from the light source wherein the fly-eye lens surface faces the emitted light and the emitted light is substantially received directly by the fly-eye lens surface from the light source,
   wherein the illumination method satisfies the condition:

$$15° \leq \tan^{-1}\frac{d}{D} \leq 31°$$

where d is a height of each of the lens cells, and D is a distance between the light source and the fly-eye lens surface.

12. The illuminating method of claim 11 satisfying the condition:

$$\frac{T}{R} \leq 1.5$$

where T is a thickness of the monolithic illuminating lens, and R is a radius of curvature of each of the lens cells.

13. The illuminating method of claim 12 wherein the light source is at least one light emitting diode (LED).

14. The illuminating method of claim 12, wherein each of the lens cells has a square shape when viewed from the light source.

15. The illuminating method of claim 11 satisfying the condition:

$$\frac{T}{R} \leq 1.5$$

where T is a thickness of the monolithic illuminating lens, and R is a radius of curvature of each of the lens cells.

16. The illuminating method of claim 15, wherein each of the lens cells has a square shape when viewed from the light source.

* * * * *